(12) United States Patent
Sakraschinsky et al.

(10) Patent No.: US 9,126,129 B2
(45) Date of Patent: Sep. 8, 2015

(54) FILTER DEVICE AND FILTER ELEMENT

(75) Inventors: Michael Sakraschinsky, St. Ingbert (DE); Stefan Hennes, Hangard (DE)

(73) Assignee: HYDA FILTERTECHNIK GMBH, Sulzbach/Saar (DE)

( * ) Notice: Subject to any disclaimer, the term of this patent is extended or adjusted under 35 U.S.C. 154(b) by 665 days.

(21) Appl. No.: 12/733,701

(22) PCT Filed: Jul. 9, 2008

(86) PCT No.: PCT/EP2008/005572
§ 371 (c)(1),
(2), (4) Date: Jun. 2, 2010

(87) PCT Pub. No.: WO2009/043397
PCT Pub. Date: Apr. 9, 2009

(65) Prior Publication Data
US 2010/0282341 A1 Nov. 11, 2010

(30) Foreign Application Priority Data

Sep. 27, 2007 (DE) .......................... 10 2007 046 208

(51) Int. Cl.
*B01D 35/30* (2006.01)
*B01D 29/21* (2006.01)
*B01D 35/00* (2006.01)

(52) U.S. Cl.
CPC .......... *B01D 29/21* (2013.01); *B01D 2201/295* (2013.01); *B01D 2201/302* (2013.01); *B01D 2201/304* (2013.01); *B01D 2201/4046* (2013.01)

(58) Field of Classification Search
CPC .. B01D 29/21; B01D 29/96; B01D 2201/295; B01D 2201/304; B01D 2295/302; B01D 2201/4046
USPC ......... 210/235, 450, 440, 455, 443, 437, 457, 210/441, 444, 453, 232, 435, 445, 451, 130, 210/137; 137/544
See application file for complete search history.

(56) References Cited

U.S. PATENT DOCUMENTS

| 4,721,563 | A | * | 1/1988 | Rosaen | 210/85 |
| 5,284,579 | A | * | 2/1994 | Covington | 210/130 |
| 6,347,712 | B1 | * | 2/2002 | Mees et al. | 210/440 |
| 8,550,255 | B2 | * | 10/2013 | Sakraschinsky et al. | 210/453 |
| 2003/0127384 | A1 | * | 7/2003 | Kapur | 210/235 |

FOREIGN PATENT DOCUMENTS

| DE | 199 17 567 A1 | 11/2000 |
| EP | 0 891 214 B1 | 1/1999 |
| EP | 1 287 871 A1 | 3/2003 |
| WO | WO 2006/012031 A1 | 2/2006 |

* cited by examiner

*Primary Examiner* — Nam Nguyen
*Assistant Examiner* — Madeline Gonzalez
(74) *Attorney, Agent, or Firm* — Roylance, Abrams, Berdo & Goodman LLP

(57) ABSTRACT

A filter device includes a filter element (9) received in a housing (1). The housing can be closed by a cover part (3) having fluid ducts (35, 41). A connecting unit is provided to create a fluid-conducting connection between the filter element (9) and an associated fluid duct (35) of the cover part (3). The connecting unit is in the form of a coupling having a movable coupling part (33) creating the fluid connection in the functional state.

15 Claims, 4 Drawing Sheets

FILTER DEVICE AND FILTER ELEMENT

FIELD OF THE INVENTION

The invention relates to a filter device with a filter element received in a housing closed by a cover part having fluid ducts. A connecting unit forms a fluid-conducting connection between the filter element and an associated fluid duct of the cover part. The invention furthermore relates to a filter element for the filter device.

BACKGROUND OF THE INVENTION

Filter devices for receiving filter elements are readily available on the market in a plurality of embodiments, for example as disclosed in EP 1 287 871 A1 and EP 0 891 214 B1. A not insignificant portion of the production costs in these filter devices originates from the formation of the connecting unit which, in the operating state in which the filtration process can take place, establishes a suitable connection between the filter element and the respective fluid duct in the cover part. The connecting unit must be designed such that the installation processes for changing the filter elements are simple and uncomplicated, but that reliable sealing occurs, even at high pressure levels. Moreover, the connecting unit, as much as possible, should be made such that in the operation of the filter device "replacement reliability" is provided. In other words, a construction is desirable in which in view of the plurality of designs of filter elements on the market, only those filter elements specially adapted to the housing and the cover part can achieve an operating state. The risk that filter elements of an unintended type with unsuitable filter properties will then be inadvertently operated is avoided.

SUMMARY OF THE INVENTION

An object of the invention is to provide an improved filter device with a connecting unit meeting the requirements imposed to a significant extent.

According to the invention, this object is basically achieved by a filter device having a connecting unit formed by a coupling with a movable coupling part. In the operating state of the device, the coupling part establishes the fluid-conducting connection between the filter element and the associated fluid duct of the cover part, i.e., assumes a coupling position in the operating state. In this way a fluid connection can be implemented forming perfect sealing. Also, corresponding construction of the filter housing, especially its cover part, ensures that the device can only be put into the operating state when the filter element installation in the housing causes the movable coupling part of the connecting unit to assume its operating or coupling position.

Preferably, a movable coupling part can be axially moved and adjoins a stationary coupling part of the connecting unit in the operating state by spring pretensioning of the movable coupling part to form a seal. This arrangement is especially advantageous in that the connecting unit is "self-controlling". Specifically the attachment of the cover part to the housing then leads directly to elastic contact of the axially movable coupling part with the associated stationary coupling part.

Especially advantageously, the movable coupling part is on the filter element, and the stationary coupling part is on the cover part and is formed by the mouth edge of the associated fluid duct. The direct interaction between the movable coupling part and mouth edge of the fluid duct leads to an especially simple and compact construction.

The element-side movable coupling part can be advantageously formed by a sleeve body forming a fluid passage from the filter cavity coaxial to the longitudinal axis and surrounded by a filter medium to the associated fluid duct of the cover part.

In this respect, the sleeve body on the outer peripheral side can be displaceably guided with the formation of a seal in a duct connected to the end cap of the filter element. The sleeve body then performs a coupling function and establishes a direct fluid passage between the fluid duct of the cover part and the inner filter cavity of the filter element conventionally bordered by a tubular, fluid-permeable support body that is in turn surrounded by a filter medium. The duct of the sleeve body can form an extension of the end of the support body adjacent to the end cap so that the sleeve body forms a coaxial extension of the filter cavity.

Advantageously, the coupling can be made such that the mouth edge of the associated fluid duct forming the stationary, cover-side coupling part defines a seal plane against which the sleeve end edge of the sleeve body forming the movable coupling part can be pressed to form an axial seal by spring pretensioning. As a result, an especially compact construction of the coupling arises.

In this configuration, on the mouth edge of the cover-side fluid duct and on the sleeve end edge of the sleeve body, sealing edges and/or sealing surfaces interact with one another and can form the axial seal.

In especially advantageous embodiments, the axial seal can be made such that the sleeve end edge and the mouth edge each form a ring surface. One ring surface is made as a continuous radial plane. The respective other ring surface is made as a radial plane with a sealing edge projecting slightly out of it. This arrangement results in especially good sealing so that operating reliability is ensured even at high pressure levels.

Especially advantageously, the sealing edge can be located annularly on the outer periphery of a ring surface such that it encloses the outer periphery of the other ring surface as a centering element. This arrangement ensures that when the cover part is attached, an extremely precise, flush alignment of the coupling parts occurs, even if components on the side of the filter element, such as the end cap, support body, and the like, as injection moldings of plastic material are subject to tolerances, since the centering formed on the sealing surfaces also ensures in this case exact alignment and thus the desired seal properties.

The subject matter of the invention is also a filter element for a filter device.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
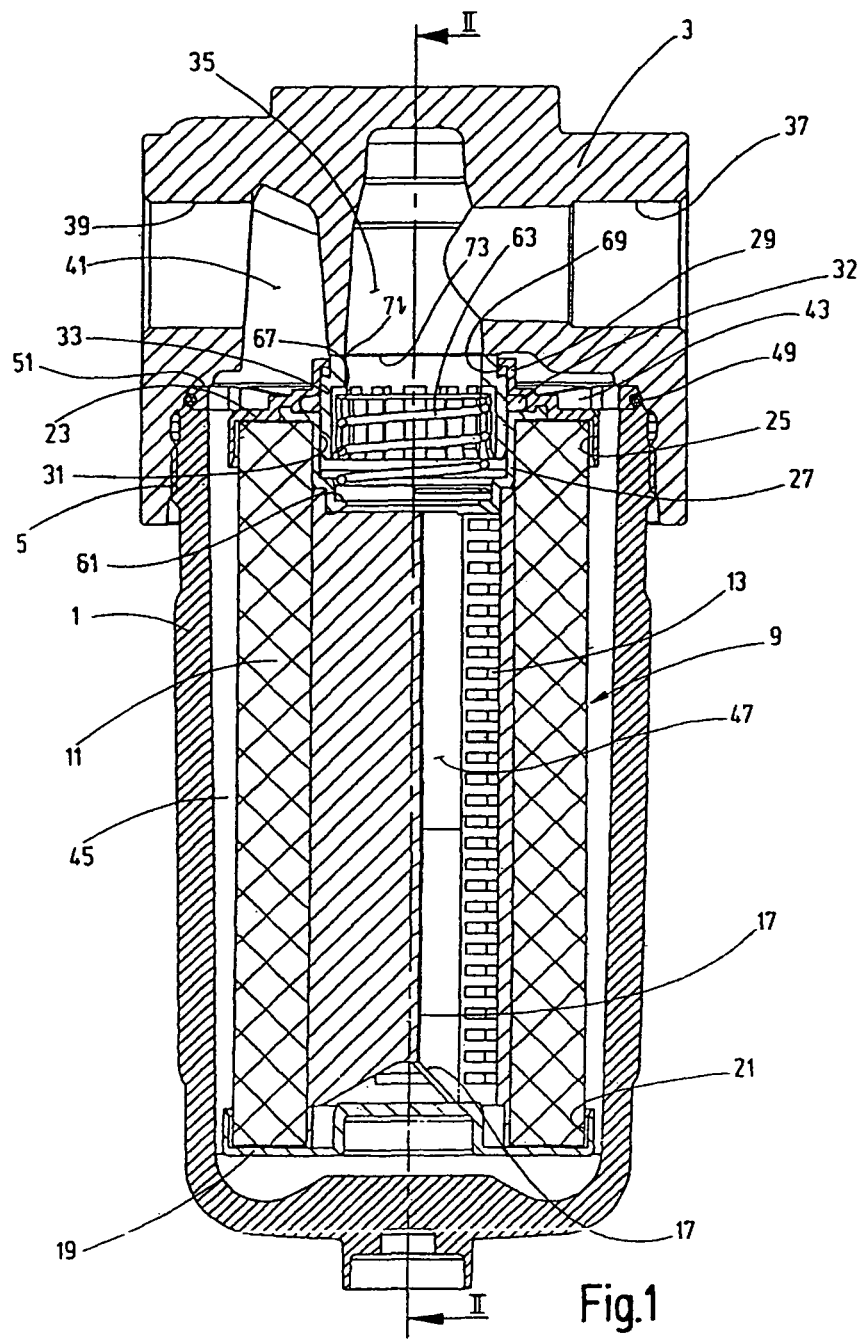
FIG. 1 is a side elevational view in section of a filter device according to a first exemplary embodiment of the invention, drawn schematically simplified and on a slightly reduced scale compared to a practical embodiment.

A cup-shaped filter housing 1 is largely circularly cylindrical and is closed on the bottom. The housing upper end can be closed by a cover part 3 detachably joined to the housing 1 via a screw connection 5. The cover part 3 in the head region has pockets 7 as encapsulated bore shoulders for a fouling display (not shown). The housing 1 can receive a filter element 9 having a conventional design with a hollow cylindrical filter medium 11, for example in the form of layers of filter mat or a multilayer, folded, or pleated filter body, surrounding a tubular support body 13 injection molded from plastic material. The support body, as is most apparent in FIG. 4, has a succession of peripheral circular rings 15 spaced apart from one another, of which only a few are numbered in the figures. As conventional for these support bodies 13, rings 15 are connected to a carrier located inside and made as a star that is three-pointed in cross section, with three points 17. On the end associated with the bottom of the cup of the housing 1, the filter element 9 is closed by a bottom cap 19 of plastic material forming an enclosure 21 for the filter medium 11. On the opposite end, an end cap 23 formed from plastic material forms the termination of the filter element 9 facing the cover part 3. The end cap 23, in a similar manner to the bottom cap 19, forms an enclosure 25 for the pertinent end of the filter medium 11.

Figure 3:
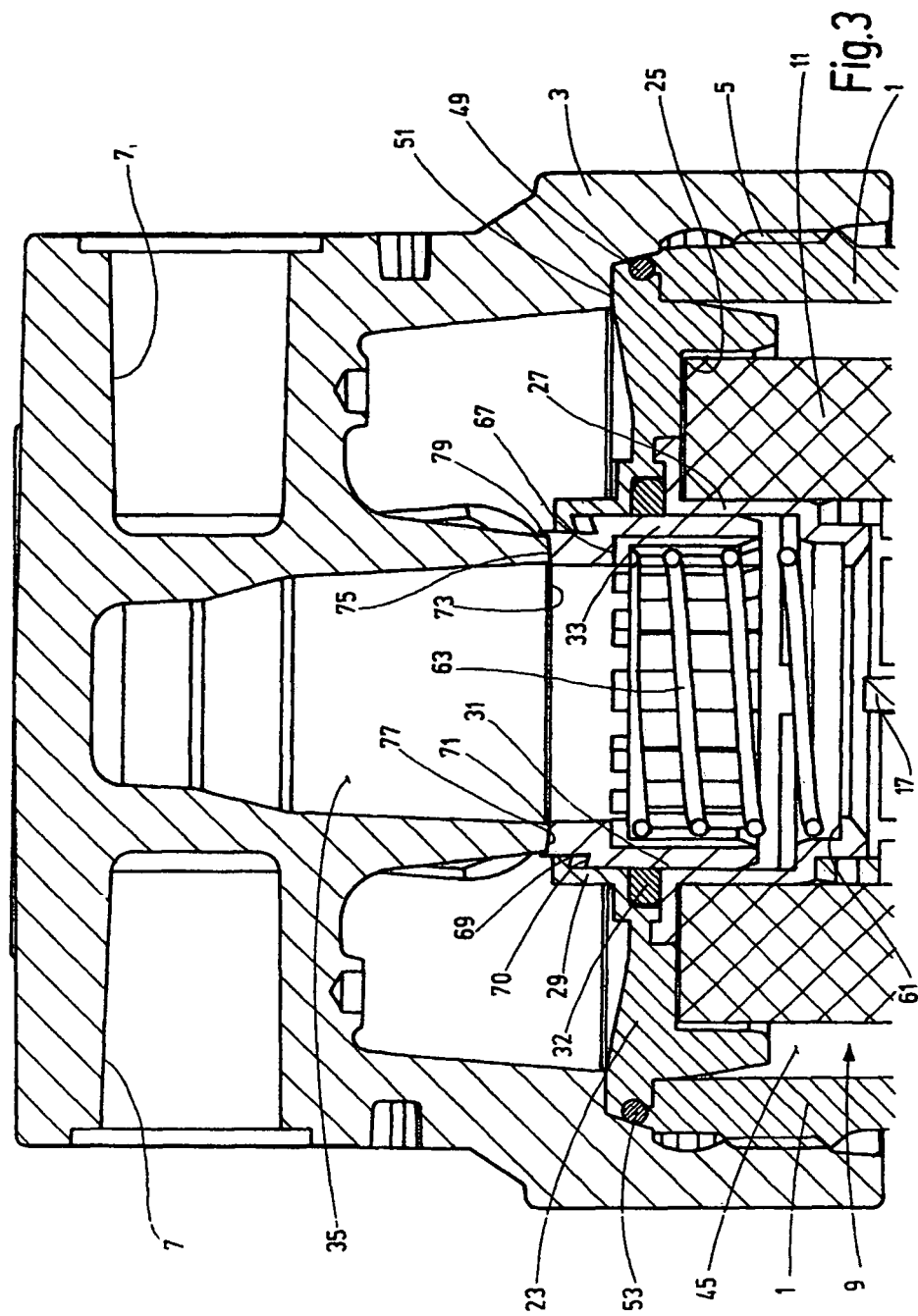
FIG. 3 is an enlarged partial section front elevational view in section of only the head part of the filter device of FIG. 2.
Figure 4:
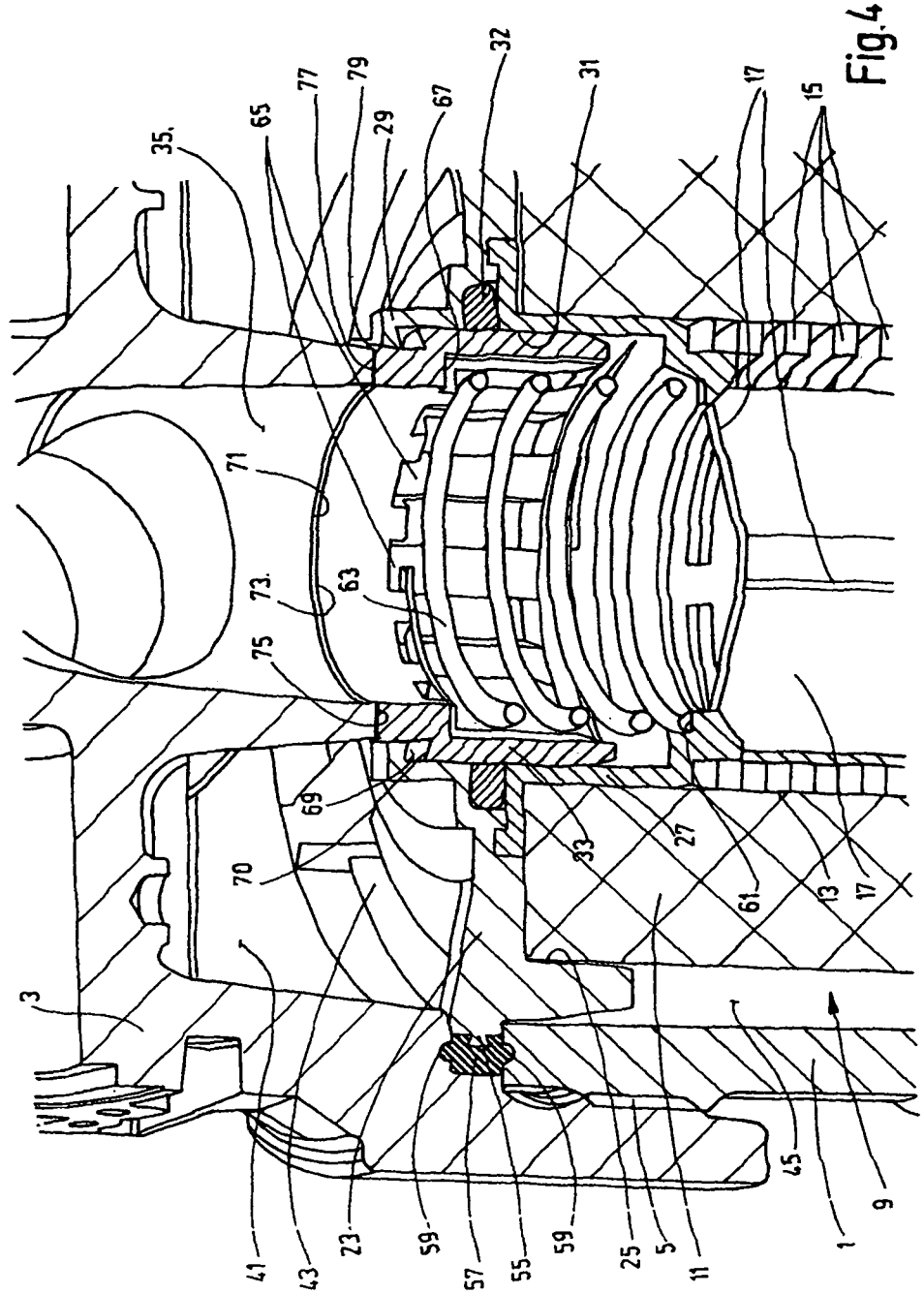
FIG. 4 is a partial perspective view in section of only the upper region of a filter device according to a second exemplary embodiment of the invention.

As shown most clearly from FIGS. 3 and 4, on the radially inside region of the enclosure 25, a hollow body 27 with an extension 29 projects axially on the radially inside end of the end cap 23 in the direction to the cover part 3 and forms a circularly cylindrical guide or guide duct 31 in which a sleeve body 33 is guided to be axially displaceable. Between the hollow body 27 and the extension 29, a seat is formed for a sealing element 32 sealing the sleeve body 33 relative to the duct 31. The sleeve body 33 is used as a movable coupling part of a connecting unit for producing a fluid connection between the filter element 9 and the fluid duct 35 in the cover part 3.

As shown in FIG. 1, the first fluid duct 35 in the cover part 3 is connected to the fluid outlet 37 for the cleaned fluid. A fluid inlet 39 located in the cover part 3, opposite outlet 37, for the fluid to be cleaned is connected in the cover part 3 to a second fluid duct 41. From duct 41, the fluid to be cleaned can flow via inflow openings 43 in the end cap 23 into the annulus 45 on the outside of the filter medium 11 forming the contaminated side of the filter device. From the outside of the filter medium, the fluid to be cleaned passes through the filter medium 11 from the outside to the inside and reaches the inner filter cavity 47 forming the clean side. From the inner filter cavity 47, the cleaned fluid travels through the sleeve body 33 forming the coupling part of the connecting unit to the fluid duct 35 of the cover part 3 and then to the fluid outlet 37.

Figure 2:
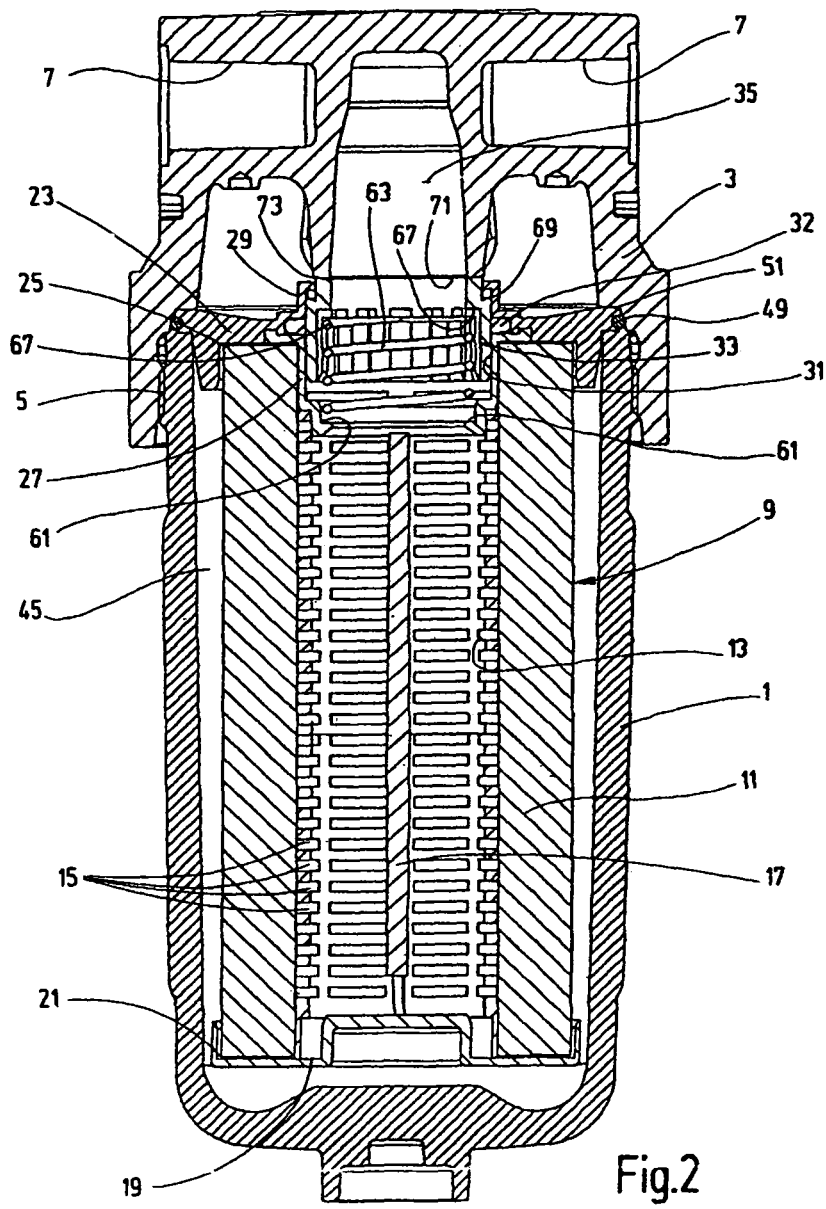
FIG. 2 is a front elevational view in section of the filter device of FIG. 1, taken along line II-II in FIG. 1.

The end cap 23 is in a sealed connection both to the cup-shaped housing 1 and to the cover part 3 by a seal arrangement 49 on the outer peripheral part of end cap 23. Seal arrangement 49 is pressed against the housing 1 when the cover part is screwed onto the housing 1 by an inner collar 51 of the cover part 3. The seal arrangement is formed in the embodiment of FIGS. 1 to 3 by a ring seal in the form of an O-ring 53. In the example shown in FIG. 4, on the outer periphery of the end cap 23, a dovetail-shaped flange ring 55 is formed on which a profile seal 57 is secured and has two lips 59 opposite one another in the axial direction. Each lip forms their own sealing region relative to the cover part 3 and relative to the housing 1. Otherwise, the embodiment from FIG. 4 corresponds to the embodiment as shown in FIGS. 1 to 3. For a description of the details of the connecting unit, reference can be made both to FIGS. 1 to 3 and also to FIG. 4.

As already mentioned, as the movable coupling part a sleeve body 33 is guided to be axially displaceable within guide duct 31. The hollow body 27 connected to the end cap 23 and forming a part of the duct 31, on its inner end region, has a shape projecting radially inward and forming a stop shoulder 61 on which one end of a helical compression spring 63 is supported. The spring is supported within the sleeve body 33, adjoining its inside ribs 65 (only a few being numbered in FIG. 3). The spring other end is supported on the inner ring shoulder 67 of the sleeve body 33. The sleeve body 33 pretensioned by the spring 63 for axial motion in the direction to the cover part 3. To limit this motion in an end position, on the extension 29 forming part of the guide duct 31, a step 69 is formed, constricts the duct and interacts with a step 70 on the outer periphery of the sleeve body 33 for limiting the pretensioned sleeve body end position. All drawing figures show the operating state of the filter device when the cover part 3 has been screwed on, with the sleeve body 33 pushed out of its end position against the pretensioning of the compression spring 63 axially into the filter element 9. This movement is due to the mouth edge 71 of the cover-side fluid duct 35, as the stationary coupling part of the connecting unit for forming the coupling connection when the cover part 3 is screwed tight, pressing on the sleeve end edge 73 of the sleeve body 33 and pushing it out of the end position. The pretensioning of the compression spring 63 is then active as a sealing force between the mouth edge 71 of the fluid duct 35 and the sleeve end edge 73 of the sleeve body 33. In other words, the coupling connection of the connecting unit is automatically established when the device is shifted into the operating state by screwing the cover part 3 onto the housing 1 containing the pertinent filter element 9.

The interacting regions of the sleeve body 33 and the fluid duct 35, which in the coupling state form the seal arrangement, are designed such that one of the annular surfaces, which are pressed against one another by the pretensioning of the spring, forms a continuous radial plane. The other ring surface forms a radial plane with a sealing edge projecting out of it. In these embodiments, the ring surface 75 on the fluid duct 35 is continuously level. The ring surface 77 along its peripheral edge forms a slightly projecting sealing edge 79. The sealing edge 79, with the radially outer edge of the ring surface 75, forms a seal in interaction with its surface edge. Additionally the edge enclosure of the mouth edge 71 of the fluid duct 35 also forms centering ensure that extremely precise alignment of the coupling connection of the connecting unit necessarily takes place when the cover part 3 is screwed on. Since the filter element 9, aside from the compression spring 63, can be made without metal, mechanical or thermal effects could lead to slight deformations. This centering constitutes an extremely advantageous contribution to the operating reliability of the device.

While various embodiments have been chosen to illustrate the invention, it will be understood by those skilled in the art that various changes and modifications can be made therein without departing from the scope of the invention as defined in the appended claims.

What is claimed is:

1. A filter device, comprising:
 a housing with first and second opposite housing ends;
 a filter element received in said housing and having opposite first and second element ends and a guide duct;

a cover part closing said first housing end and having first and second fluid ducts;

a connecting unit forming a fluid-conducting connection between said first fluid duct and said filter element, said connecting unit having an axially movable coupling part on said filter element at said first housing end being axially movable relative to said filter element and establishing the fluid-conducting connection in an operating state of said connecting unit, said movable coupling part adjoining a stationary coupling part of said connecting unit on said cover part, said movable coupling part being spring pretensioned in a direction away from said second element end against said stationary coupling part to form a seal therebetween by a spring in said filter element, said movable coupling part including a sleeve body displaceably guided in said guide duct; and a position limiter on said filter element engaging said movable coupling part to limit axial motion thereof in an end position thereof under spring pretensioning, said position limiter including a step on said guide duct constricting said guide duct and including a stop on the outer periphery of said sleeve body.

2. A filter device according to claim 1 wherein
said stationary coupling part comprises a mouth edge of said first fluid duct.

3. A filter device according to claim 2 wherein
said sleeve body forms a fluid passage between a filter cavity in said filter element and said first fluid duct, said filter cavity being coaxial to a longitudinal axis of said filter element and being surrounded by a filter medium.

4. A filter device according to claim 3 wherein
said sleeve body forms a seal in said guide duct, said guide duct being connected to an end cap on said filter element.

5. A filter device according to claim 4 wherein
said mouth edge defines a seal plane; and
said sleeve body having a sleeve end edge pressed against said mouth edge by said spring pretensioning to form an axial seal therebetween.

6. A filter device according to claim 5 wherein
said mouth edge and said sleeve end edge have at least one of sealing surfaces and sealing edges.

7. A filter device according to claim 5 wherein
each of said mouth edge and said sleeve end edge comprises a ring surface forming said axial seal, one of said ring surfaces being a continuous radial plane, the other of said ring surfaces being a radial plane with a sealing edge projecting slightly therefrom.

8. A filter device according to claim 7 wherein
said sealing edge is located annularly on an outer periphery of the other of said ring surfaces and encloses an outer periphery of the one of said ring surfaces as a centering element.

9. A filter device according to claim 1 wherein
said sleeve body comprises an inner ring shoulder;
said guide duct has a stationary stop; and
said spring comprises a compression spring located in said sleeve body between said inner ring shoulder and said stationary stop.

10. A filter element, comprising
a support body having opposite first and second ends;
a filter medium surrounding said support body;
an axially movable coupling part on said support body at said first end being axially movable relative to said support body and establishing a fluid conducting connection with a cover part mounted on a filter housing in an operating state thereof, said movable coupling part being pretensioned to an axially extended position by a spring in said support body, said movable coupling part including a sleeve body forming a fluid passage to a filter cavity in said support body, said filter cavity being coaxial to a longitudinal axis of support body; and
a position limiter engaging said movable coupling part to limit axial movement thereof in an end position thereof under spring pretensioning.

11. A filter element according to claim 10 wherein
said sleeve body is displaceably guided with formation of a seal in a guide duct connected to an end cap on said filter medium.

12. A filter element according to claim 11 wherein
said sleeve body comprises a sleeve end edge with a ring surface for forming an axial seal with a fluid duct mouth edge on the cover part.

13. A filter element according to claim 11 wherein
said position limiter comprises a step on said guide duct and constricting said guide duet and comprises a stop on an outer periphery of said sleeve body.

14. A filter element according to claim 13 wherein
said sleeve body comprises an inner ring shoulder;
said guide duct has a stationary stop; and
said spring comprises a compression spring located in said sleeve body between said inner ring shoulder and said stationary stop.

15. A filter element according to claim 10 wherein
said coupling part is pretensioned in a direction away from said second end.

\* \* \* \* \*